Nov. 2, 1954   A. L. BASTIAN ET AL   2,693,558
ELECTRIC FOLLOW-UP MOTOR CONTROL APPARATUS
Filed April 3, 1951   2 Sheets-Sheet 1

INVENTORS
ARTHUR L. BASTIAN
ALEXANDER F. RAPISARDA
BY
Frank A. Bower
ATTORNEY

INVENTORS
ARTHUR L. BASTIAN
ALEXANDER F. RAPISARDA
BY
Frank A. Bower
ATTORNEY 2,693,558
Patented Nov. 2, 1954

UNITED STATES PATENT OFFICE 2,693,558

ELECTRIC FOLLOW-UP MOTOR CONTROL APPARATUS

Arthur L. Bastian, Yonkers, and Alexander F. Rapisarda, Mount Vernon, N. Y., assignors to Ward Leonard Electric Company, Mount Vernon, N. Y., a corporation of New York Application April 3, 1951, Serial No. 219,068

9 Claims. (Cl. 318—29)

This invention relates to electrical control apparatuses and is directed particularly to the movement of a control device to or through sequentially positioned points of stoppage and to the simultaneous or sequential operation of a plurality of such apparatuses. This invention is directed particularly to the control and operation of theatre dimmers singly, or grouped or in a plurality of groups.

The main object of this invention is to provide an electrical system for continuous control of adjusting means actuated between predetermined limits to effect a regulation, for instance, of lighting effects in theatres or the like. Another object is to provide an even and direct transition without fluctuations or reversal of the adjusting means between the predetermined limits. Another object is to provide an electrical system automatically stopping the adjusting means at said predetermined settings. Another object of the invention is to provide for presetting prior to operation to predetermine the relative settings of said adjusting means at each operation. Another object is to provide a control apparatus in which the actuation of the control means from one extreme setting to the other will produce a direct following of the adjusting means from one predetermined setting to another predetermined setting without intermediate reversal of direction of actuation of the adjusting means during the transition period. Another object is to provide a circuit for controlling a plurality of sets of grouped apparatuses in which each set has a different predetermined setting.

Other objects and advantages will be understood from the following description and accompanying drawings illustrating preferred embodiments of the invention.

Figure 1:
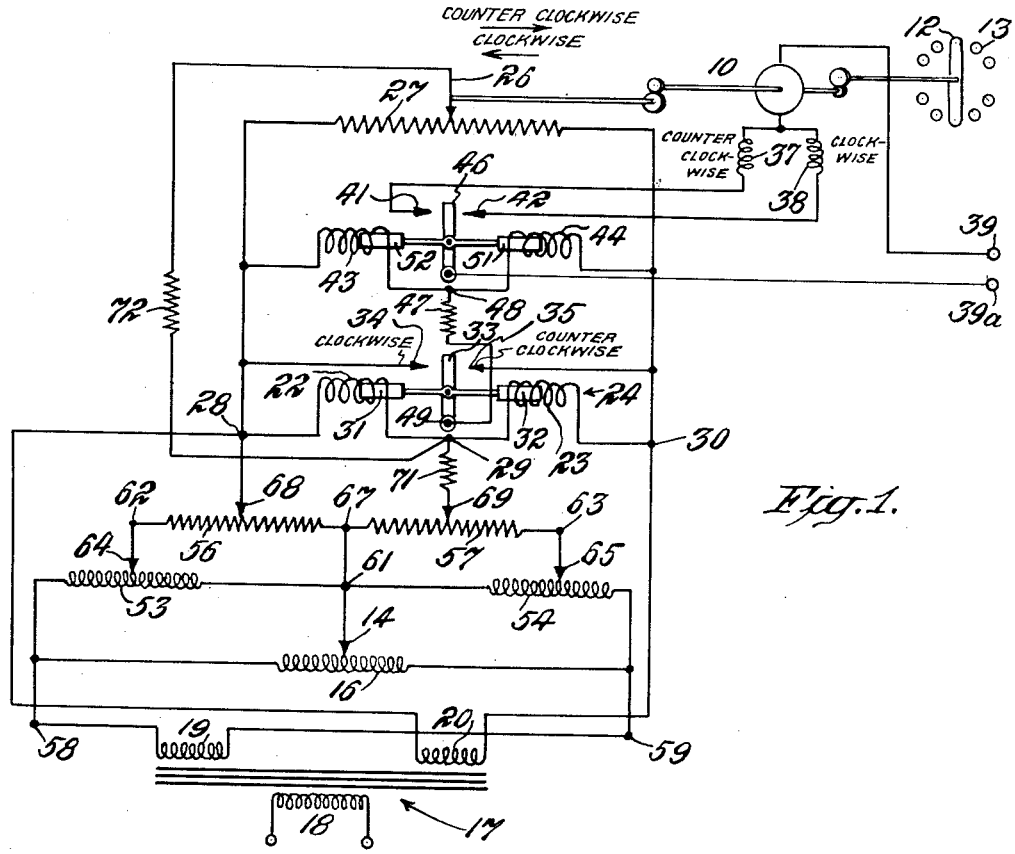
Fig. 1 is a schematic diagram of the electrical control circuit.
Figure 2:
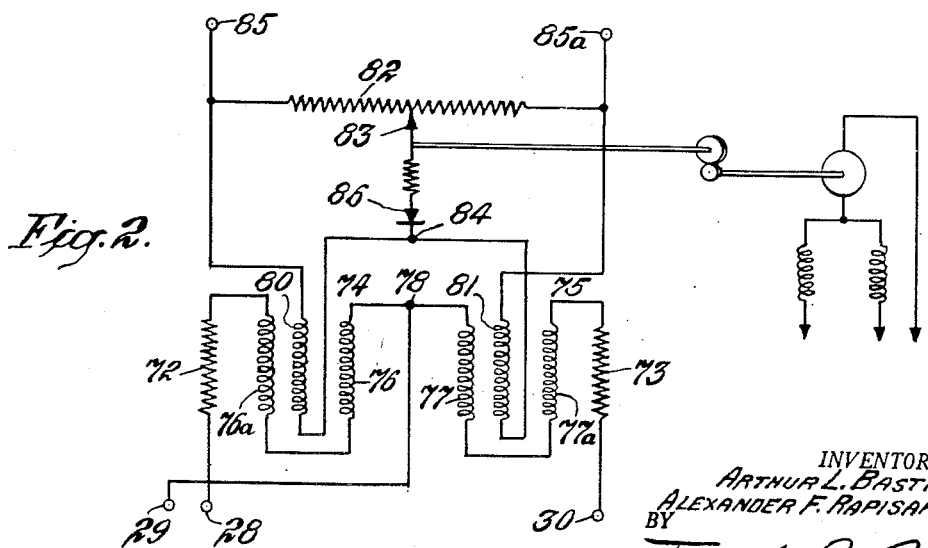
Fig. 2 is a schematic diagram of another form of the relay voltage apportioning circuit.

In an embodiment of the invention shown in the drawings an electrical control circuit controls the operation and determines the direction of rotation of an electric motor 10. The motor 10 is mechanically connected to turn the control arm 12 of a theatre dimmer 13. The electrical control circuit has an input transformer 17 with a primary winding 18 and two secondary windings 19 and 20. The primary winding 18 is connected to a suitable alternating current supply. The secondary windings 19 and 20 are isolated and separate from one another. The output voltage across the secondary winding 19 is equal to the output voltage across the secondary winding 20. The secondary winding 20 is connected to the terminals 28, 30 across the coils 22, 23 of the differential relay 24. The coils 22, 23 are connected in series between the terminals 28, 30 and are wound so that when the coils are energized their magnetic pulls are opposed. The potentiometer 27 is connected between the terminals 28, 30 in parallel with the coils 22, 23 and has a variable control arm 26 in sliding contact with the potentiometer 27 connected through the resistor 72 to the terminal 29 between the coils 22 and 23 and in turn driven by rotation of motor 10 in synchronism with control arm 12. The voltage impressed by the secondary winding 20 is apportioned between the coils by the follower arm 26.

The voltage across the secondary winding 19 is impressed through a range of values across the terminals 28, 29 by the resistors 56, 57 autotransformers 53, 54 and autotransformer 16 to create voltage differences between the terminals 28, 29 and 29, 30 and unbalance the relay 24 driving the motor 10 to reposition follower arm 26. When the control circuit is in a balanced condition, the voltage across the terminals 28 and 29 is equal to the voltage across the terminals 29 and 30. The armatures 31, 32 are then in the neutral position and the middle contact 33 is spaced from the fixed contacts 34, 35. In case the voltage across the terminals 29, 30 is larger than the voltage across the terminals 28, 29 the relay 24 is in the unbalanced condition and the current in coil 23 is greater than the current in coil 22. The armature 32 is drawn in by the increase flux and pivots contact 33 against the fixed contact 35. When the voltage across the terminals 28, 29 is larger than the voltage across the terminals 29, 30, the current through coil 22 will be larger than the current through coil 23 and the armature 31 will be drawn into coil 22, pivoting the contacts 33 against the fixed contact 34. The resistors 71 and 72 are provided to separate the unbalanced voltages impressed across the terminals 28, 29 by the secondary windings 19 and 20 and prevent a shorting of the coil 22 on a voltage unbalance.

The rotation of the motor 10 is controlled by the field windings 37, 38 with field winding 37 turning the motor 10 in a counter-clockwise direction, and field winding 38 in a clockwise direction. When neither field winding 37 or 38 is energized, the motor 10 is still. The field windings 37, 38 are connected in parallel across the terminals 39 and 39a of a suitable power source, either A. C. or D. C., depending upon the type of motor used. The contacts 41, 42 of the relays 43, 44 respectively are connected in series with the respective field windings 37, 38 completing either circuit on energization of the relay. The contacts are normally open and the windings deenergized.

The coils 43, 44 are connected across the terminals 28 and 30 and are balanced so that the contact 46 is in an open position and not in contact with either of the fixed contacts 41 and 42. A resistor 47 is connected between the coils 43, 44, at the terminal 48, and the pivoted contact 33 at the terminal 49. When the pivoted contact 33 engages the fixed contact 34, the coil 43 is shunted and voltage of the terminals 28, 30 is applied across the terminals 48, 30 increasing the voltage on the coil 44. This unbalances the relay causing the armature 51 to be drawn to the coil 44 and closing the contacts 46, 42. The field coil 38 then becomes energized and rotates the motor in a clockwise direction. When the pivoted contact 33 engages the fixed contact 35 of the relay 24, the coil 44 is shunted and voltage across the terminals 28, 30 is then applied across the terminals 28, 48 unbalancing the motor relay in the opposite direction and drawing the armature 52 into the coil 43 and closing contacts 41, 46. Coil 37 is energized by the current from the power source across the terminals 39, 39a and the motor 10 rotates in a counterclockwise direction.

It is thus seen that with the relay 24 unbalanced by the increase in voltage across the terminals 28 and 29, the motor is turned in a clockwise direction and by the increase in voltage across the terminals 29, 30, the motor is turned in a counter-clockwise direction.

The apportionment of the voltages between the terminals 28, 29, and 29 and 30 is controlled by the potentiometer 27 and by the autotransformers 16, 53, 54 and potentiometers 56, 57. The autotransformer 16 is connected to the terminals 58, 59 of the secondary winding 19. The windings of autotransformers 53, 54 are connected in series across the terminals 58 and 59 and in parallel with the winding of autotransformer 16. The variable control arm 14 of the autotransformer 16 is connected to the terminal 61 between the autotransformers 53, 54. The potentiometers 56, 57 are connected in series between the terminals 62, 63 and are connected by the variable control arms 64, 65 to the autotransformers 53, 54 respectively. The center terminal 67 between the two potentiometers 56, 57 is directly connected to the terminal 61 and to the variable control arm 14. Control arms 64, 65 determine the voltages on potentiometers 57, 56 respectively, whereas control arm 14 determines the voltage on both potentiometers 56, 57. It is thus seen that a voltage proportioning network is provided by which the voltage across the terminals 58, 59 may be proportioned between the potentiometer 56, 57.

The potentiometers 56 and 57 are coupled to the relay 24 by the variable control arms 68 and 69. Control arm 68 is connected to the terminal 28 and slidably engages the potentiometer 56. Contact 69 is connected through the resistor 71 to the terminal 29 and slidably engages the potentiometer 57. Thus various amounts of the voltage across terminals 62, 67 and terminals 67, 63 may be applied to the terminals 28, 29.

When the contact 14 is at the left end of the autotransformer 16, the autotransformer 54 and potentiometer 57 solely control the position of the arm 12 of the dimmer 13 and when the contact 14 is in the extreme right, the autotransformer 53 and the potentiometer 56 solely control the position of arm 12. For intermediate positions of the control arm 14, the combinations of the potentiometer 56, autotransformer 53, potentiometer 57 and autotransformer 54 control the position of arm 12 and also set the limits of movement depending on the settings of the respective variable control arms 68, 64 on one hand, 69, 65 on the other.

However, if the control arm 14 and control arm 26 are centered and control arms 64, 65 are positioned at the ends of the transformers connected to the terminals 58, 59 respectively and the variable control arm 68 and 69 are centered on the potentiometers 56 and 57, the voltage across terminals 28 and 29 will be equal to the matching voltage across the coil 23 of the relay 24. In this condition the motor 10 will not be actuated; variations in contact 14 of the autotransformer 16 do not disturb this balanced condition since as the voltage across one resistor decreases, the voltage across the other resistor will be correspondingly increased.

For instance, with the above settings and with the control arm 14 moved to the terminal 58, the entire voltage of the secondary winding 19 is applied across the potentiometer 57 and the voltage across the terminals 63 and 67 will be equal to the voltage across the terminals 28 and 30. The autotransformer 53 and the potentiometer 56 are short-circuited and the terminals 61 and 67 are of the same potential as the terminals 58 and 28. Since the control arm 69 is centered, the voltage applied by the control arms 68 and 69 will be equal to the matching voltage across the terminals 29, 30. The relay will still be in balanced condition. Or if control arm 68 is moved to the left and control arm 69 is moved to the right the same distance movement of control arm 14 still will not disturb the balance of the relay 24. This is also true of control arms 64, 65. Any symmetrical arrangement of the control arms 68, 69 and control arms 64, 65 the relay 24 will remain in a balanced condition with the change in position of the control arm 14. The movement of the control arm 14 operates the motor when the various control arms are positioned to cause a voltage change across the terminals 28, 29.

Either control arm 65 or the control arm 69 may move the follower arm 26 and the dimmer arm 12 from one extreme position to the other and provide intermediate positions of the follower arm 26 or dimmer arm 12. With the control arm 14 at its extreme left position and control arm 69 at terminal 63, the control arm 65 has control of the follower arm 26. The potentiometer 56 and autotransformer 53 are shorted with terminals 58, 62, 67, 61 and 28 at substantially the same potential. The voltage across terminal 67, 63 is impressed across terminal 28, and control arm 69. With control arm 65 at the extreme right position the voltage of the secondary winding 19 is impressed across terminal 28 and control arm 69 and the control arm 26 will move to its extreme left position to impress the voltage of the secondary winding 20 across terminals 29, 30 to balance the relay 24. With control arm 65 at its extreme right position the coil 22 is shorted and substantially no voltage is applied across it. The control arm then is moved to its extreme right position to short the coil 23 and balance the relay 24.

Follower arm 26 may be similarly controlled by the control arm 69 when control arm 65 is at terminal 59. Intermediate positions of the follower arm 26 may be set by intermediate positions of control arm 69 or 65 or a combination of positions of control arms 69 and 65.

The potentiometer 56 with control arm 68 and autotransformer 53 with control arm 64 provided another set of controls to position the follower arm 26. With control arm 14 at the extreme right position the control arm 68 and control arm 64 control the position of the follower arm 26. If control arm 64 is positioned to the extreme left and control arm 68 is at the extreme left position the voltage of the secondary winding 19 is impressed across the coil 22 and control arm 26 is positioned left position to impress the voltage of the secondary winding 20 across coil 23 and balance the relay 24. If control arm 68 is then moved to the extreme right position the follower arm 26 will move to the extreme right position. The coil 22 will be shorted and the follower arm will be moved to the terminal 30 end of the potentiometer 27 to short the coil 23. With control arm 14 at its extreme right position the control arm 68, 64 controls the control arm 26 from one end of potentiometer 27 to the other. With control arm 68 positioned at terminal 62 the control arm 64 controls the follower arm 26 from one extreme position to another. If control arm 68 is set at an intermediate position the control arm 64 may move the follower arm 26 from an extreme right position to an intermediate position which is predetermined by the setting of control arm 68 and the further to the right the control arm 68 is set the shorter the path of travel of the follower arm 26.

From the foregoing it is readily seen that the potentiometer 56 with control arm 68 and auto-transformer 53 with control arm 64 can set one predetermined position of the follower arm 26 and potentiometer 57 with control arm 69 and auto-transformer 54 with control arm 65 can set another predetermined limit and by moving the control arm 14 from one extreme position to the other the follower arm 26 can be moved from one predetermined position to the other predetermined position.

The potentiometer 56 with control arm 68 and potentiometer 57 with control arm 69 are used primarily to preset the positions of the follower arm 26, and are referred to as preset control means. As a second control means the auto-transformer 53 with control arm 64 and auto-transformer 54 with control arm 65 may also preset the positions of the control arm 26 by reducing the voltage impressed across potentiometers 56 and 57 respectively. Another purpose of the auto-transformer is to vary the position of the follower arm 26 without disturbing the position of the preset control arms 68, 69 and control arm 14, and are referred to as master control means. Theatre lights may be brought from dim to ¾ of full intensity in the following manner. The degree of intensity is preset by positioning the control arm 68 at ¾ of its maximum displacement from its extreme right position. When control arm 64 is moved from the right position to the left position the follower arm 26 will stop at a ¾ position. If subsequently it is scheduled to change to a ½ intensity the control arm 69 may be set at the mid-position and control arm 65 at the extreme right. The control arm 14 is then moved from right to left and intensity of the lights changes from ¾ to ½ intensity. The auto-transformer 16 with control arm 14 is a third control means primarily for shifting from one predetermined position to another predetermined position and is referred to as a fader control means. However, the control arm 14 may be set at intermediate positions to position the follower arm 26 at a corresponding intermediate position.

In theatre dimming the variable control arm of the fader is nominally positioned at its extreme end positions, and fader control is affected by the movement of this variable control arm from one end position to the other, causing the positioning of the dimmer arm from the predetermined position set by one of the preset circuit elements and its associated master circuit element to the preset predetermined position set by the other preset circuit element and its associated preset circuit element, directly without reversal during transition.

Consider the variable control arms 64, 65, respectively, of the master control means 53, and 54 positioned at intermediate positions within their ranges of control— for instance ¾ to the left of center connection 61 on auto-transformer 53 and ⅓ to the right of center connection 61 on auto-transformer 54. Consider also the variable control arms 68 and 69 of the preset control means 56 and 57 positioned at intermediate positions within their ranges of control, say ½ and ¼ to the left and right respectively of center connection 61.

With the control arm 14 of the fader control means, positioned at the extreme right-hand position and the positioning of the preset and master control means as indicated above, the motor 10 will position under the control of the preset potentiometer 56 and its associated master control or autotransformer 53 at ¾ × ½ or ⅜ of its full range of travel or in a dimmer application at ⅜ full intensity. The positioning of control arms 69 and 65 on potentiometers 57 and 54, respectively, does not control under these conditions but merely allows for the presetting of a predetermined position obtainable by the movement of the fader control arm 14 to the extreme left in a subsequent operation of fading.

Movement of the control arm 14 to the extreme left will position the dimmer arm ½ × ¼ or ⅛ of its full range of travel or ⅛ full intensity.

Thus for purposes of dimming, the lights can be faded from an active scene at ⅜ full intensity to another scene preset at a definite predetermined intensity of ⅛ full intensity directly without reversal during transition by operating the fader control from one extreme end position to the other. This does not exclude the use of this fader control means as a means setting any intermediate positioning of the driving means, but is cited as a normal dimmer operation.

For intermediate positioning by means of this fader control, the positioning of the dimmer arm at ¼ intensity under the above set conditions is readily obtained by positioning variable control arm 14 at the midpoint. Other intermediate positioning can be obtained by proportionate settings of the control arm 14.

Another use of the master control means in the control of an individual driving means as illustrated in Fig. 1, is to proportion the control of the driving means within any range set by its associated preset control means. For example, with the fader variable control arm set at the extreme right, and the variable control arm of the preset control means 56 positioned say, ¾ to the left of the center connection 67, the movement of the variable control arm 64 of the master control means 53 from 61 to 58 will position the driving means ¾ of its full range of travel and in a dimmer application would correspond to changing the light intensity of a scene from dim to ¾ full bright.

The variable control arm 26 may be mechanically connected to the armature of the motor through the arm 12 or directly connected to the motor. In either case the arm 26 moves in synchronism with the arm 12 so that for each position of the arm 12 there is a corresponding position of the control arm 26. The control arm 12 may be coupled to the armature of the motor 10 in any suitable manner, preferably by reduction gears so that the motor makes several revolutions to a single movement of the control arm 12.

Instead of having a resistor 27 to proportion the voltage of the secondary winding 20 across the coils 22, 23 the saturable core reactors 74, 75 may be coupled across the terminals 28, 30 in order to isolate the adjusting means from the control circuit. The reactor 74 has windings 76, 76a connected in series and reactor 75 has windings 77, 77a connected in series. The winding 76a is connected to terminal 28 and windings 77a connected to terminal 30. Terminal 29 is connected to the center terminal 78 between the winding 76 of reactor 74 and winding 77 of reactor 75. The flux of the reactors 74, 75 is controlled respectively by the windings 80, 81 connected in series across a proportioning resistor 82. Variable contact 83 is coupled to the terminal 84 between the windings 80 and 81 and if an alternating current supply is connected across the terminals 85, 85a of the resistor 82, a rectifier 86 is connected between the terminal 84 and variable control arm 83 to provide a direct current to the coils 80, 81. The remainder of the electrical circuit is the same as in Fig. 1. The saturation of the reactors and proportioning of voltages between the terminals 28, 29 and 29 and 30 is obtained by adjusting the variable control arm 83 on the resistor 82 in proportioning the currents to the coils 80, 81.

Figure 3:
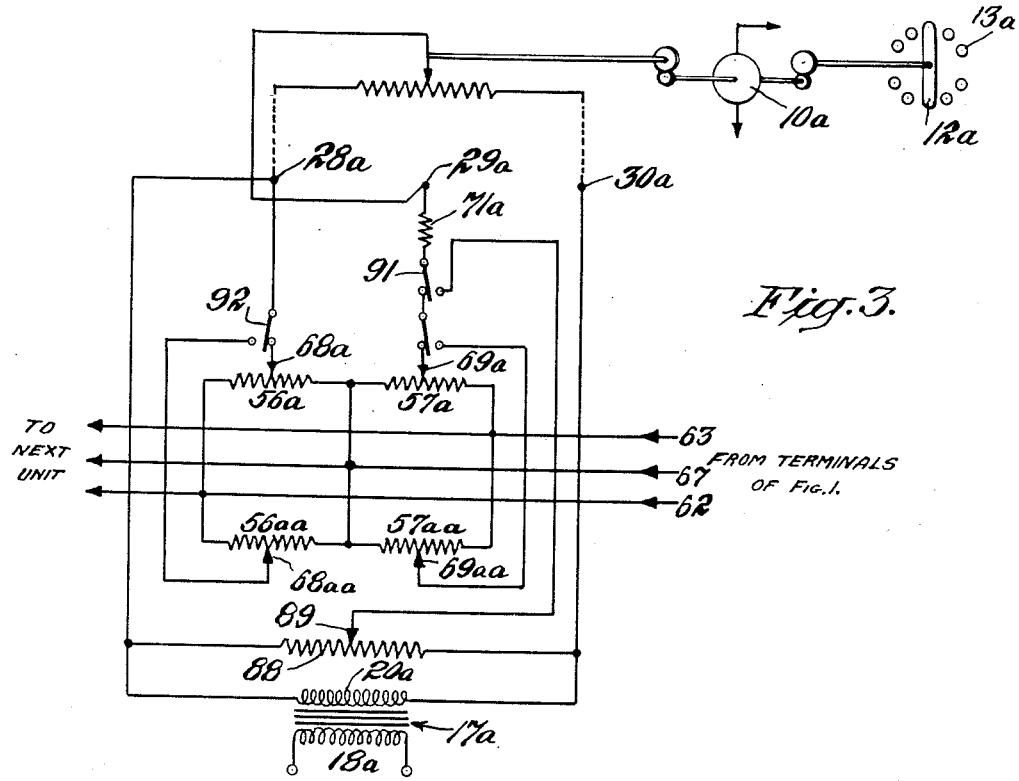
Fig. 3 is a schematic diagram showing the coupling of additional driving motors actuated by a common control and an alternative independent control for separate actuation.
Figure 4:
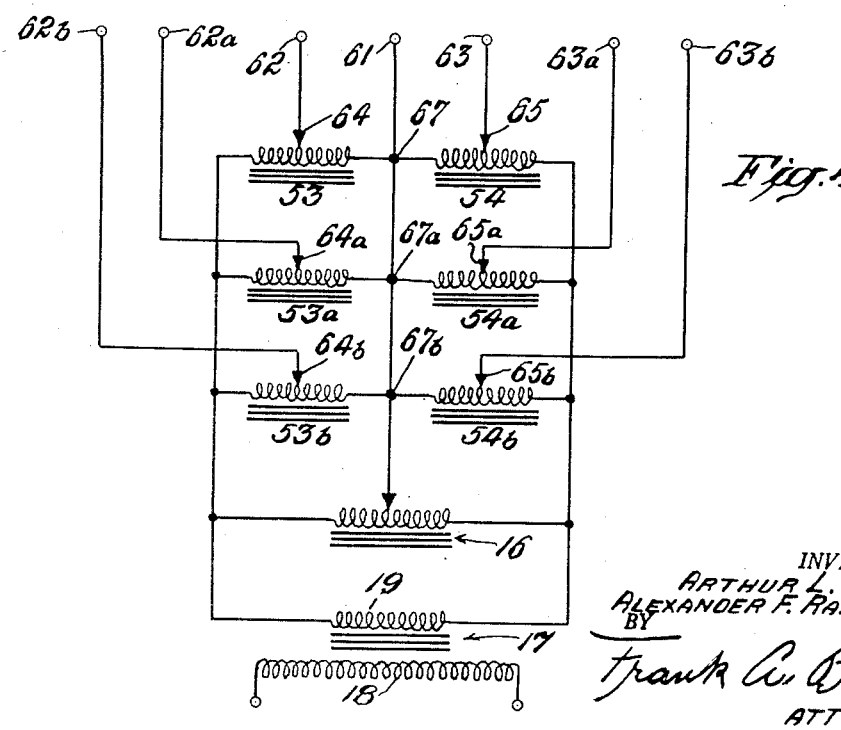
Fig. 4 is a schematic diagram showing the coupling for additional driving motors actuated by separate balancing controls and a common control actuating all the motors at the same time.

The control means having described as controlling a single motor. The circuit for controlling a plurality of motors is illustrated in Figs. 3 and 4. The preset control means can only control a single motor; therefore, for each motor there must be a separate preset control means. A single master control means can control a plurality of motors by controlling a plurality of preset control means. A single fader control means can control a plurality of motors through a plurality of preset controls and a single master control means or a plurality of master control means In Fig. 3 the preset positions of the dimmer or dimmer arms 12a is controlled by the potentiometers 56a, 57a connected across the common terminals 62a, 67a and 67a, 63a respectively. These terminals are directly connected to terminals 62, 67 and 67, 63 respectively of the auto-transformers 53, 54 shown in Fig. 1. The circuit arrangement of the relays and matching resistors is the same as in Fig. 1. A second set of potentiometers 56aa, 57aa may be connected across the terminals 62a, 67a, and 67a, 63a to provide a second set of controls for presetting the position of the dimmer arm 12a. The control arms 68a, 68aa of potentiometers 56a, 56aa are connected to terminal 28a through the switch 92 and the control arms 69a, 69aa to resistor 71a through switch 87. Either one set of potentiometers or the other are connected across terminals 28, 29 and 29, 30. A separate secondary winding 20a is connected across the terminals 28a, 30a. The secondary winding is isolated from and in phase with the secondary winding 19. A number of these circuits may be thus connected to the auto-transformers 16, 53, 54 and controlled by them. The control arms of the resistors 56a, 57a, 56aa, 57aa are set in position for each network so that a separate state of balance may be individually reached for each network. An independent balance potentiometer 88 is provided across the secondary 20a with a control arm 89 connected to the terminal 30 through the resistor 71 and switch 91. The limit resistors and auto-transformers are cut out of the circuit by the switch 91 and the control of motor 10a is exercised by the potentiometer 88. This permits the independent operation of each motor.

In Fig. 4 each additional network has a set of auto-transformers all of which are controllable by a single fader control. Each set of auto-transformers 53a, 54a; 53b, 54b; and 53c, 54c respectively are connected across the secondary 19 in parallel with the control auto-transformer 16. The center terminals 67, 67a, 67b are connected to each other and the terminal 61. The control arms 64, 64a, 64b, 65, 65a, 65b are connected to terminals 62, 62a, 62b, 63, 63a, 63b. Each network is separately controlled by respective sets of auto-transformers and the intensity of the lights adjusted by them separately. The single auto-transformer 16 controls all the networks so that the lights of all the networks may be raised and lowered together.

The preset controls 56, 57, 56a, 57a, 57b and follower controls 27, 82 instead of being potentiometers may be auto-transformers or other voltage proportioning circuit elements.

Although the foregoing disclosure is typically applied to motor driven theatre dimmers the invention described herein is not limited to this application. It is readily adapted to other similar applications in which the setting, varying, or presetting of the limits of actuation of a controlling device, for instance, a thyratron operation of transversing or cutting machines, the thyratron being actuated by the voltage unbalance through vacuum tubes and magnetic amplifiers.

We claim:

1. Electrical apparatus for controlling the actuation of an adjusting means comprising an electrical balanced means having two opposing elements actuating said adjusting means on occurrence of a voltage unbalance across said elements, voltage proportioning circuit impedances in series each having a control arm in adjustable engagement with a respective impedance, said control arms connected to one of the elements to define within presettable limits a range of voltages impressed on said element, variable voltage means coupled across said series impedances to vary the voltage across said elements through said range to unbalance the electrical means, and voltage matching means coupled to said elements and operated by said adjusting means to impress a balancing voltage within said range to said elements and stop the adjusting means at a desired setting.

2. Electrical apparatus for controlling the movement of an electric motor comprising a voltage balanced differential relay having two opposing coils actuating said motor on occurrence of a voltage unbalance across said coils, voltage proportioning circuit elements in series each having a control arm in adjustable engagement with a respective element, said control arms connected to one of the coils to define within preset limits a range of voltages impressed on said coil and adapted to impress within presettable limits a range of voltages on said coil, variable voltage means coupled across said series elements to vary the unbalancing voltage through said range to unbalance the relay, and voltage matching means coupled to said coils and operated by said motor to impress a balancing voltage within said range to said coils and stop the motor at a desired setting.

3. Electrical apparatus for controlling the movement of an electric motor comprising a voltage balanced differential relay having two opposing coils actuating said motor on occurrence of a voltage unbalance across said coils, two controlling impedances in series each having a control arm in adjustable engagement with a respective impedance, said arms connected to the ends of one of the coils and adapted to impress an unbalancing voltage thereon and actuate said motor, said arms being set to limit the range of voltage unbalance, variable voltage means coupled to said impedances to vary the unbalancing voltage through said range, and two matching saturable reactors in series coupled across said coils and having a common mid-point and having the saturation of said reactors varied by said motor to impress a balancing voltage within said range to said coils and stop the motor at a desired position.

4. Electrical apparatus for controlling the movement of an electric motor comprising a voltage balanced differential relay having two opposing coils actuating said motor on occurrence of a voltage unbalance across said coils, two controlling resistors in series each having a control arm in adjustable engagement with respective resistor, said arms connected to the ends of one of the coils and adapted to impress a corresponding unbalancing voltage thereon and actuate said motor, said control arms being set to limit the range of voltage unbalance, variable voltage means coupled to said resistors to vary the unbalancing voltage through said range, and two matching saturable reactors coupled across said coils and having a common mid-point between said windings connected to said control arm apportioning the current through said windings to create a balancing voltage within said range in said reactors impressed on said coils and stop said motor at a desired position.

5. Electrical apparatus for controlling the movement of an electric motor comprising a voltage balanced differential relay having two opposite coils actuating said motor on occurrence of a voltage unbalance across said coils, two resistors in series each having a variable control arm in adjustable engagement with a respective resistor, said control arm connected to the ends of one of the coils and adapted to impress a corresponding unbalancing voltage thereon and actuate said motor, said control arms being set to limit the range of voltage unbalance, two autotransformers in series connected in parallel with said resistors and having control arms in variable engagement with the autotransformers, each control arm connected to a respective end of said resistors varying the voltage across said resistors, a common connection connecting the mid-points between said resistors and autotransformers, an autotransformer coupled in parallel across said resistors and said first autotransformers and having a control arm connected to said common connection and in variable engagement with said second autotransformer to apportion the voltage impressed across the resistors and transformers and on movement of said control arm vary the apportionment to impress an unbalancing voltage on said coil to actuate said motor, and voltage matching means coupled to said coils and operated by said motor to impress a balancing voltage within said range across said coils and stop the motor at a desired position.

6. Electrical apparatus for controlling an electric motor comprising a voltage balanced differential relay having two opposing coils actuating said motor on the occurrence of a voltage unbalance between said coils, a controlling resistor having variable limit control arms on opposite sides of an intermediate point and coupled across one of said coils to impress a corresponding unbalancing voltage between the set limits determined by said control arms, a controlling autotransformer coupled in parallel with said resistor and having a variable control arm connected to an intermediate point of said transformer and the intermediate point of said resistor to vary the unbalancing voltage between the set limits actuating said motor, and a matching resistor coupled across said coils with a variable slidably engaging control arm connected at a point between said coils and operated by said motor to apportion the voltage impressed across said coils and said matching resistor to restore the voltage balance between said coils and stop the motor at a desired position within the set limits.

7. Electrical apparatus for controlling the movement of an electric motor comprising a voltage balanced differential relay having two opposing coils actuating said motor on occurrence of a voltage unbalance across said coils, two preset autotransformers in series each having a variable control arm in adjustable engagement with a respective autotransformer, said control arms respectively connected to the ends of one of the coils and adapted to impress a corresponding unbalancing voltage thereon and actuate said motor, said control arm being set to limit the range of voltage unbalance, two master autotransformers in series, connected in parallel with said series preset autotransformers and having control arms in variable engagement with the master autotransformers each control arm connected to a respective end of said preset autotransformers varying the voltage across said preset autotransformers, a common connection connecting the mid-points between said preset autotransformers and master autotransformers, a fader autotransformer coupled in parallel across said preset autotransformers and said master autotransformers and having a control arm connected to said common connection and in variable engagement with said fader autotransformer to apportion the voltage impressed across the preset autotransformers and master autotransformers and on movement of said control arm vary the apportionment to impress an unbalancing voltage on said coil to actuate said motor, and voltage matching means coupled to said coils and operated by said motor to impress a balancing voltage within said range across said coils and stop the motor at a desired position.

8. An electrical apparatus for actuating an adjusting means through an electromagnetic device on occurrence of an electrical unbalance comprising a variable voltage means adapted to be connected to a voltage source and having an adjustable contact, an impedance means connected in parallel with said variable voltage means and having a set of contacts in adjustable engagement with said impedance means on opposite sides of an intermediate point, said impedance contacts being connected to said electromagnetic device to impress a range of voltage on said device, said variable voltage means contact being in adjustable engagement with said variable voltage means and connected to said intermediate point for proportioning the line voltage between the portions of the impedance on opposite sides of the intermediate point, and voltage matching means coupled to said impedance contacts and operated by said adjusting means.

9. An electrical circuit for actuating an adjusting means through an electromagnetic device on occurrence of an electrical unbalance comprising two impedances in series, each having a variable control arm in adjustable engagement with a respective impedance and coupled to said electromagnetic device means to impress a voltage thereon, two second impedances in series, each having a control arm in adjustable engagement therewith connected to the extreme end of a respective first impedance, a common connection connecting the mid-points between said first impedance and said second impedances, a variable voltage means coupled in parallel across said first impedances and said second impedances and having a control arm connected to said common connection in variable engagement with said variable voltage means to apportion the voltage impressed across the first impedances and the second impedances and on movement of said control arm to vary the apportionment to impress an unbalancing voltage on said electromagnetic device.

(References on following page)

References Cited in the file of this patent

UNITED STATES PATENTS

| Number | Name | Date |
|---|---|---|
| 2,460,276 | Bernas | Feb. 1, 1949 |
| 2,463,681 | De Giers et al. | Mar. 8, 1949 |
| 2,488,780 | Ray | Nov. 22, 1949 |
| 2,503,513 | Schellman | Apr. 11, 1950 |
| 2,534,801 | Siltamaki | Dec. 19, 1950 |